Feb. 20, 1940.        T. TOGNOLA        2,190,956
MAGNETO GENERATOR
Filed June 18, 1937        2 Sheets-Sheet 1

Witness:
Burr W. Jones

INVENTOR.
Tullio Tognola
BY Clinton S. James
ATTORNEY.

Feb. 20, 1940. T. TOGNOLA 2,190,956
MAGNETO GENERATOR
Filed June 18, 1937 2 Sheets-Sheet 2

Witness:
Burr W. Jones

INVENTOR.
Tullio Tognola
BY Clinton S. Janes
ATTORNEY.

Patented Feb. 20, 1940

2,190,956

UNITED STATES PATENT OFFICE 2,190,956

MAGNETO GENERATOR

Tullio Tognola, Sidney, N. Y., assignor to Bendix Aviation Corporation, South Bend, Ind., a corporation of Delaware Application June 18, 1937, Serial No. 148,891

7 Claims. (Cl. 171—209)

The present invention relates to a magneto generator and more particularly to a novel form of rotor for a multi-polar high tension ignition generator.

It is an object of the present invention to provide a novel multi-polar high tension generator which is efficient and reliable in operation while being small and light in construction as compared to known types of comparable output.

It is another object to provide such a device which incorporates a rotor having a single permanent magnet of simple form requiring a minimum of machining operations.

It is another object to provide such a device in which a large number of high tension discharges are secured for each revolution of the rotor.

It is a further object to provide such a device which is so arranged that both static and dynamic balance of the rotor are assured.

It is a further object to provide such a device in which the magnetic circuits are short and of low reluctance.

It is a further object to provide such a device in which the rotor is composed of parts so interfitting as to produce a very rigid structure capable of safe operation at high rotative speeds.

Further objects and advantages will be apparent from the following description taken in connection with the accompanying drawings in which.

Figure 1:
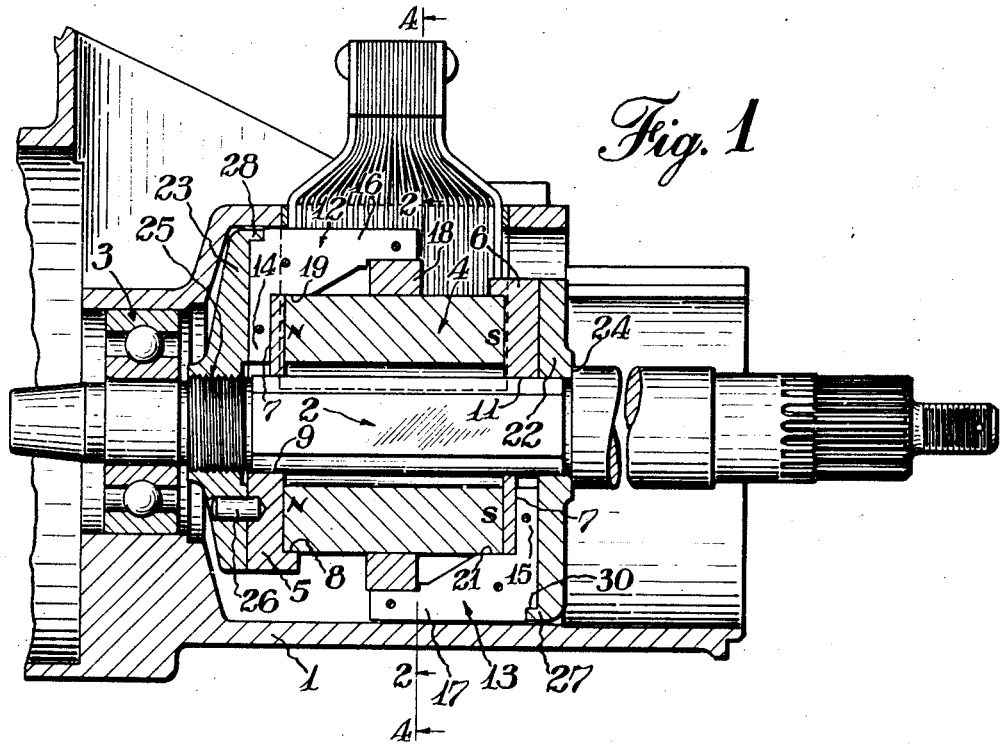
Fig. 1 is a longitudinal substantially mid-sectional view of a preferred form of the invention.
Figure 5:
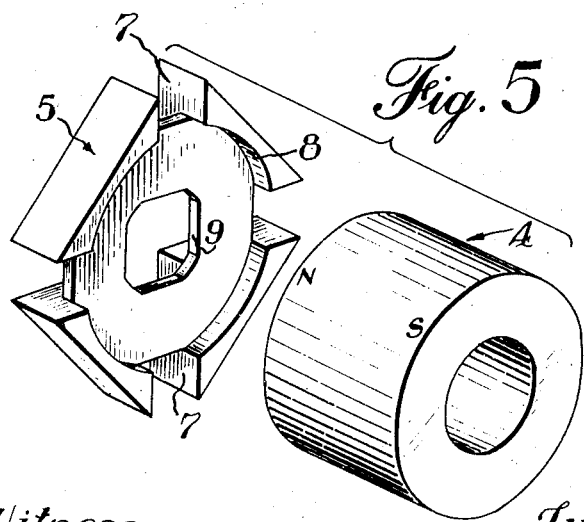
Fig. 5 is a detail in perspective showing the magnet and one supporting cross member in spaced relation thereto.

Referring first to Fig. 1 of the drawings, there is illustrated a frame 1 in which a rotor shaft 2 is suitably journalled as by means of bearings 3. A hollow cylindrical permanent magnet 4 having poles at its ends as indicated is mounted on the rotor shaft 2 in spaced relation thereto by means of supporting members 5 and 6 in the form of discs of magnetic material having radial slots 7 (Fig. 5) and shoulders 8 adapted to rest on the polar ends of the magnet 4 enclosing and supporting the same. The supporting members 5 and 6 are provided with central openings 9 and 11 having non-circular configurations, and the rotor shaft 2 is provided with a corresponding non-circular configuration whereby the supporting members are non-rotatably connected thereto.

A plurality of L-shaped laminated pole shoes 12 and 13 are mounted on the ends of the magnet 4 and have radially extending arms 14 and 15 located in the radial slots 7 of the supporting members 5 and 6, and longitudinally extending arms 16 and 17 projecting into interdigitating relation at the medial plane of the magnet 4, the ends of said arms being spaced therefrom by means of a non-magnetic spacing and anchoring ring 18, while the intermediate portions of the pole shoes rest on the ends of the magnet 4 as indicated at 19 and 21.

Figures 2, 3:
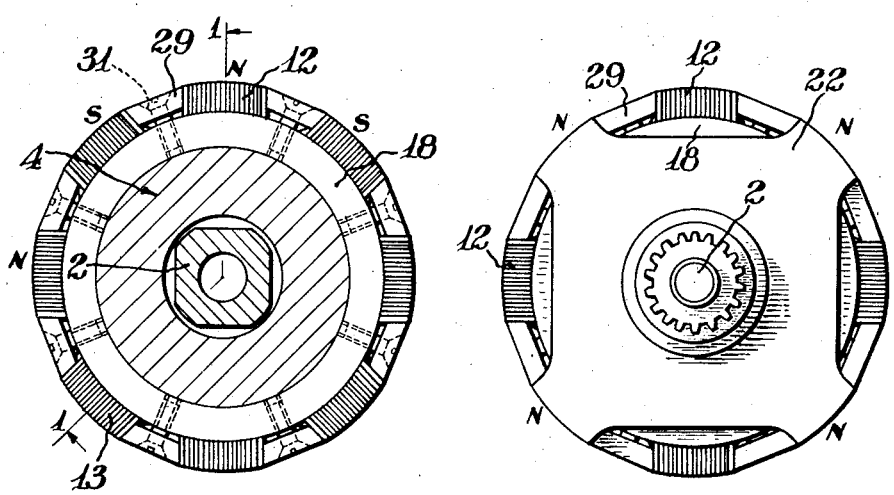
Fig. 2 is a section of the rotor taken substantially on the line 2—2 of Fig. 1.
Fig. 3 is an end view of the rotor illustrated in Fig. 1.

Means for clamping the supporting members, pole shoes and magnet together on the rotor shaft 2 are provided in the form of clamping members 22 and 23, the member 22 being mounted on the shaft 2 in abutting relation with a shoulder 24 thereon while the clamping member 23 is threaded on said shaft as indicated at 25, being locked in clamping position by any suitable means such as a drift pin 26. The clamping members are preferably provided with flanges 27 and 28 seating in corresponding recesses 30, 36 in the medial portions of the pole shoes 13, 12 in order to prevent radial movement thereof, and the ends of the arms 16, 17 of the pole shoes are clamped to the spacing ring 18 by means of wedge members 29 (Fig. 2) which are drawn up tightly by means such as screws 31 entering the ring 18 so as to maintain the equal spacing of the arms 16, 17 and retain them against radial movement.

Figure 4:
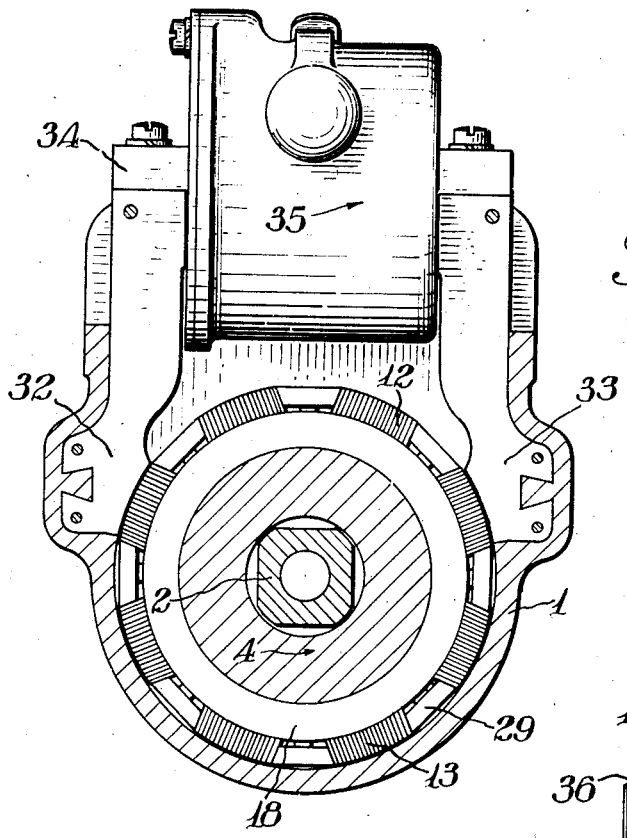
Fig. 4 is a section taken substantially on the line 4—4 of Fig. 1, the coil being shown in elevation.
Figure 6:
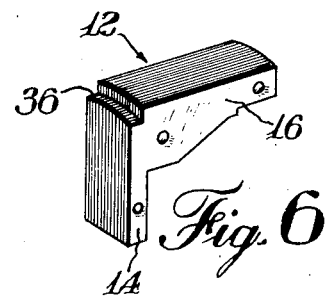
Fig. 6 is a detail in perspective of one of the laminated pole shoes.

The external magnetic circuit is completed by means of stator pole members 32 and 33 (Fig. 4) mounted in the frame 1 as by being cast therein, and extending upwardly into engagement with a core 34 of an induction coil 35 of any suitable form. The pole shoes 32 and 33 are so arranged that they cooperate simultaneously with rotor shoes 12, 13 of opposite polarity.

In the operation of the device, rotation of the rotor causes the interdigitating ends of the rotor pole shoes 12, 13 to cooperate in sequence with the stator pole shoes 32, 33, thus causing a plurality of reversals of flux to traverse the coil 35 for each revolution of the rotor. It will be understood that the output from the coil so energized is used for ignition purposes in the usual manner so that illustration of the auxiliary apparatus for that purpose is deemed unnecessary.

It will be noted that the rotor herein described is inherently well-balanced by reason of its symmetrical construction, and that the magnetic circuits are arranged to be very short and to efficiently convey the flux from the magnet to the external portion of such circuits while providing for a large number of reversals of such flux for each revolution of the rotor. The parts, and in particular the pole shoes 12, 13, are also interlocked and supported in such a manner as to afford great physical strength to the rotor, enabling it to be used at high rotative speeds without danger of distortion and injury due to the effect of centrifugal force.

Although but one embodiment of the invention has been shown and described in detail, it will be understood that other embodiments are possible and that various changes may be made in the proportions and arrangements of the parts without departing from the spirit of the invention as defined in the claims appended hereto.

What is claimed is:

1. In a magneto rotor, a cylindrical magnet with poles at its ends, slotted end plates of magnetic material supporting the ends of the magnet, a rotor shaft on which said end plates are mounted, laminated L-shaped pole pieces each having one arm mounted in an end plate slot and the other arms extending axially of the magnet and spaced therefrom, and non-magnetic means for supporting and anchoring the ends of said axially extending arms.

2. In a magneto rotor, a cylindrical magnet with poles at its ends, radially slotted end plates of magnetic material supporting the ends of the magnet, a rotor shaft on which said end plates are non-rotatably mounted, laminated L-shaped pole shoes each having one arm mounted in an end plate slot, the other arms extending in interdigitating relation axially of the magnet and spaced therefrom, means for clamping said end plates and pole shoes to the shaft, and non-magnetic means for supporting and anchoring the ends of said interdigitating arms.

3. In a magneto rotor, a cylindrical magnet with poles at its ends, slotted end plates of magnetic material supporting the ends of the magnet, a rotor shaft on which said end plates are mounted, laminated L-shaped pole pieces each having one arm mounted in an end plate slot and the other arms extending in interdigitating relation axially of the magnet and spaced therefrom, means for clamping said end plates and pole shoes to the shaft, a non-magnetic ring surrounding the magnet and supporting the ends of the interdigitating arms in spaced relation thereto, and means for clamping said ends of the arms thereto.

4. In a magneto rotor, a cylindrical magnet with poles at its ends, radially slotted end plates of magnetic material supporting the ends of the magnet, a rotor shaft on which said end plates are non-rotatably mounted, laminated L-shaped pole shoes each having one arm mounted in an end plate slot, the other arms extending in interdigitating relation axially of the magnet and spaced therefrom, means for clamping said end plates and pole shoes to the shaft, a non-magnetic ring surrounding the magnet and supporting the ends of the interdigitating arms in spaced relation thereto, and non-magnetic wedge means interposed between said ends for circumferentially spacing the same and clamping them to the supporting ring.

5. A magnetic rotor comprising a permanent magnet with poles at the ends thereof, an end plate of magnetic material at each end of said magnet for supporting the latter, rotatable means supporting said end plates, clamping means including a member adjacent each of said plates, a plurality of pole pieces having portions extending radially between said adjacent plates and members and portions extending axially of the magnet, and non-magnetic means for supporting and anchoring the ends of said axially extending portions.

6. A magnetic rotor comprising a permanent magnet with poles at the ends thereof, an end plate of magnetic material at each end of said magnet for supporting the latter, rotatable means supporting said end plates, clamping means including a member adjacent each of said plates, a plurality of pole pieces having portions extending radially between said adjacent plates and members and portions extending axially of the magnet, and non-magnetic means for supporting and anchoring the ends of said axially extending portions, said clamping members having axially extending portions adapted to hold said pole pieces against radial movement relative to said end plates.

7. A magnetic rotor comprising a permanent magnet with poles at the ends thereof, end plates of magnetic material supporting the ends of said magnet, rotatable supporting means for said end plates, a plurality of pole pieces each having a portion in contact with and extending radially of one of said end plates and a portion extending axially of said magnet, the ends of said axially extending portions being in inter-digitating relation, means for clamping said pole pieces to said end plates for rotation therewith, and non-magnetic means for supporting and anchoring said inter-digitating portions.

TULLIO TOGNOLA.